INVENTOR
V. A. RAYBURN
BY
ATTORNEY

INVENTOR
V. A. RAYBURN
BY
ATTORNEY

July 30, 1957  V. A. RAYBURN  2,801,057
MATERIAL HANDLING APPARATUS
Filed Oct. 24, 1952  8 Sheets-Sheet 6

INVENTOR
V. A. RAYBURN
BY
ATTORNEY

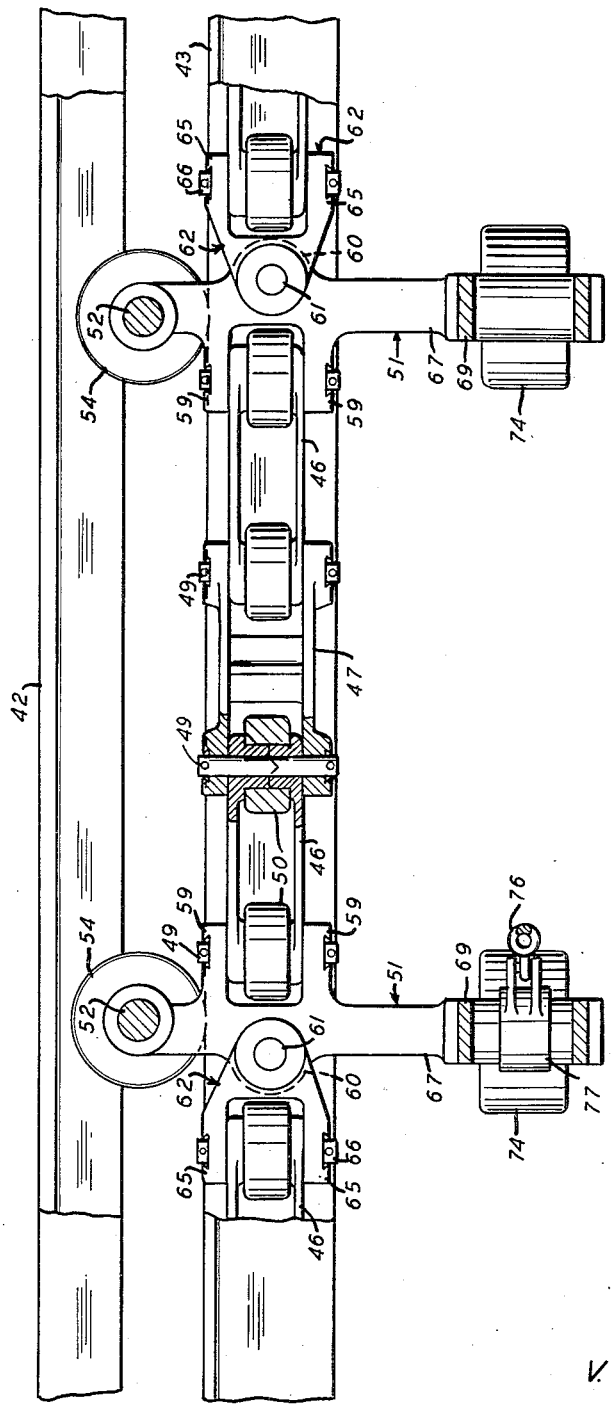

United States Patent Office 2,801,057
Patented July 30, 1957

2,801,057

MATERIAL HANDLING APPARATUS

Vincent A. Rayburn, Baltimore, Md., assignor to Western Electric Company, Incorporated, New York, N. Y., a corporation of New York Application October 24, 1952, Serial No. 316,608

2 Claims. (Cl. 242—67.3)

This invention relates to material handling apparatus, and more particularly to apparatus for transporting materials.

Many types of insulated wire are manufactured by continuously advancing a core through a continuous extruding and vulcanizing machine wherein it is enveloped by a continuous covering of a vulcanized insulating or jacketing compound, such as a rubber compound or a synthetic rubber-like compound. The large scale production of insulated wire of this type makes it necessary to transport large quantities of vulcanizable compounds from compound processing areas to the continuously operating extruding and vulcanizing machines which may be located at remote areas in a plant. To insure against costly interruptions in production, it is important that the supply of vulcanizable compounds at the extruders be adequate to maintain the continuous operation thereof.

To fulfill the foregoing requirement, material handling apparatus designed for transporting such compounds from compound processing areas to the extruders, must of necessity, provide an optimum large haul capacity and a buffer storage capacity sufficient to allow for variations or interruptions in the output of the compound processing area or in the demands of the extruders. In addition, the material handling apparatus must provide means for preventing the contamination of the compounds by foreign matter and, in the case where the compounds must be heated and kept at elevated temperatures, means must be provided for thermally insulating the compounds while they are temporarily stored or enroute to the extruders.

It is an object of this invention to provide new and improved material handling apparatus.

It is a further object of this invention to provide new and improved apparatus for transporting materials.

Apparatus illustrating certain features of the invention, may include a closed loop of track for supporting material-carrying containers and having portions thereof adjacent to two separate areas. A second closed loop of track is provided for supporting empty containers and likewise has portions thereof adjacent to both areas. Either of the closed loops may be connected to any of a plurality of siding tracks by means of selectively operable switching means. Drive means are provided for propelling the containers around the closed loops of track.

A complete understanding of the invention may be had from the following detailed description of a material handling apparatus embodying certain features thereof, when taken in conjunction with the appended drawings, in which:

Fig. 11 is an enlarged, fragmentary, partly broken away, vertical section taken along line 11—11 of Fig. 8.

Figure 1:
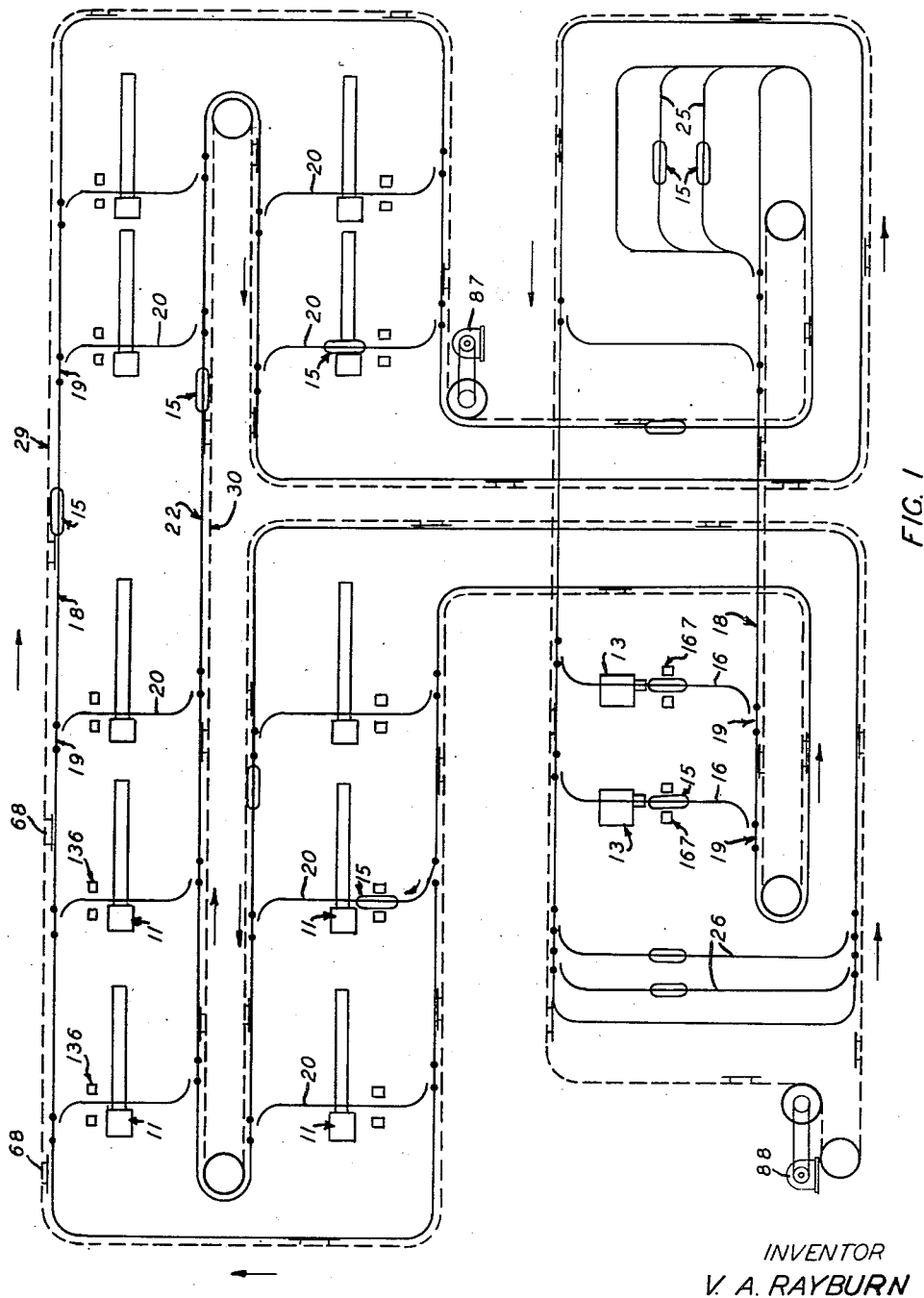
Fig. 1 is a schematic plan view of the apparatus.

The material handling apparatus illustrated schematically in Fig. 1 of the drawings provides means for transporting a vulcanizable compound from compound strippers or compound coolers located in a compound processing area, to extruders 11—11 which are located at a relatively remote area in a plant with respect to the processing area. Assuming it is desired that the compound be supplied at room temperature to the extruders 11—11, the compound in the form of strips, one of which designated 12 is shown in Fig. 2, is cooled in suitable coolers 13—13 after leaving suitable compound mixing and working apparatus (not shown).

Figure 2:
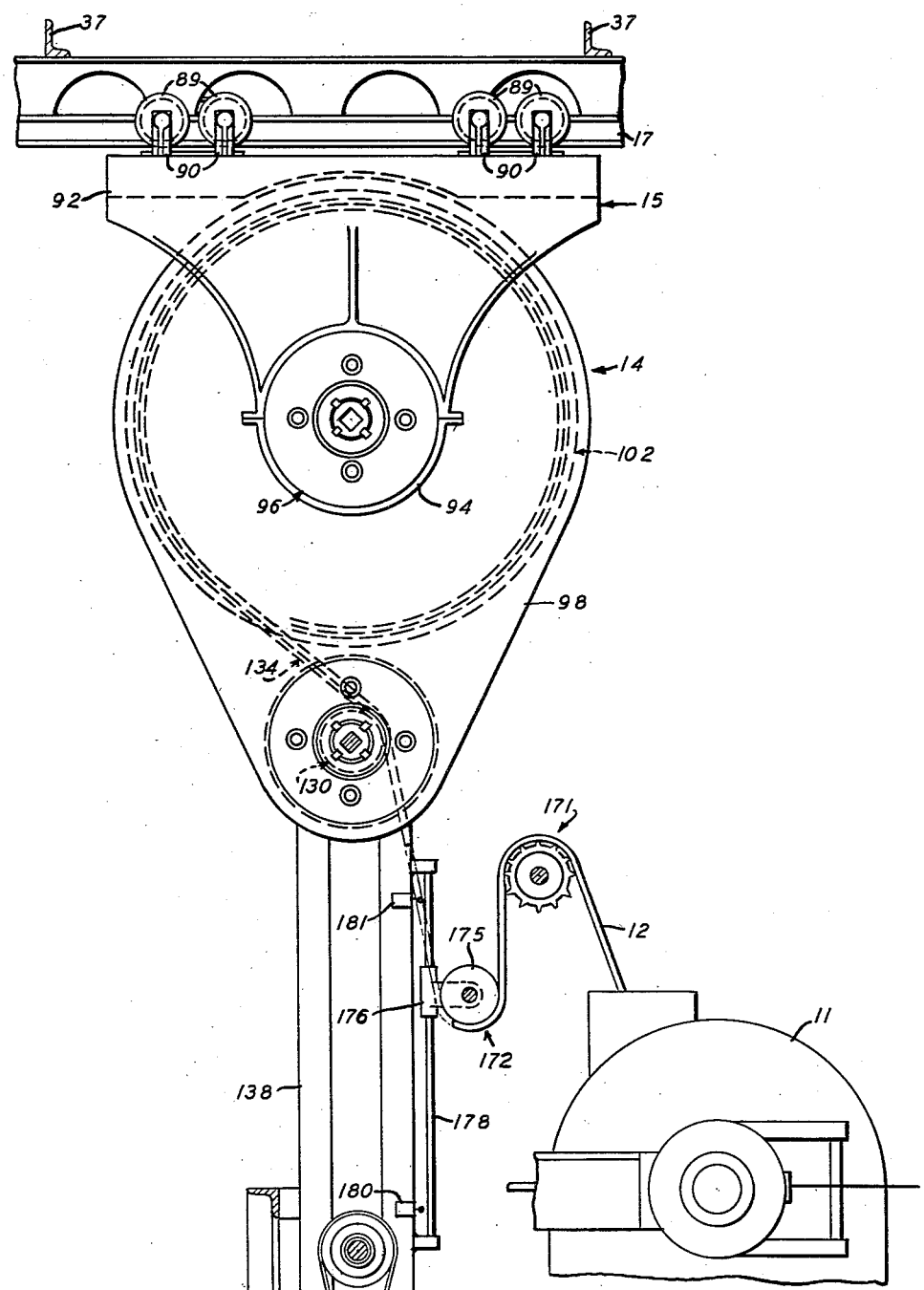
Fig. 2 is an enlarged, fragmentary, partially schematic elevation of a portion of the apparatus.

The compound strip 12 is loaded from the coolers 13—13 into compound strip magazines, one of which designated 14, is shown in detail in Fig. 2. The magazines 14—14 are suspended from monorail carriers 15—15, which travel along a supporting monorail 17 (Fig. 2). When one of the magazines 14—14 is fully loaded with a length of compound strip 12, the magazine and its associated carrier 15 may be moved manually from one of a plurality of monorail loading sidings 16—16, which serve the coolers 13—13, and switched onto a "loaded magazine" monorail line 18 by means of well known monorail switch mechanisms, shown schematically at 19—19 in Fig. 1. It will be noted that the "loaded magazine" line 18 leads to and completely encompasses the area accommodating the extruders 11—11.

The carriers 15—15, transporting the loaded magazines 14—14, may be individually and selectively switched from the monorail line 18 by means of associated switch mechanisms 19—19 onto unloading sidings 20—20 associated with the individual extruders 11—11. After unloading its supply of compound strip 12 into an extruder 11, an empty magazine 14 and its associated carrier 15 may be moved manually from the siding 20 and switched onto an "empty magazine" monorail line 22 by means of one of the switch mechanisms 19—19.

One of the salient features of this material handling apparatus is the provision for keeping the loaded and empty magazines 14—14 separate, each on their respective monorail lines 18 and 22, thereby preventing any mixup of the loaded and the empty magazines. In addition to providing separate sidings 16—16 and 20—20 for loading and unloading, respectively, separate monorail storage sidings, shown schematically at 25—25 and 26—26 (Fig. 1), are provided for storing the loaded and the emtpy magazines 14—14, respectively. The provision of the separate sidings 16—16 and 20—20 for loading and unloading operations, respectively, which require widely different terminal times, avoids delays and interruptions in the continuous flow of magazines along the monorail lines 18 and 22.

Two separate, endless, power driven, tractor chains 29 and 30 (Fig. 1) are associated with the monorail lines 18 and 22, respectively. The tractor chains 29 and 30 are mounted on suitable support structures paralleling their associated monorail lines. To illustrate the general structural arrangement of the monorail lines 18 and 22 with respect to their associated, paralleling tractor chains 29 and 30, the monorail 17 forming the monorail line 18 and its associated tractor chain 29 are shown in detail in Figs. 7 and 8 of the drawings. Since the basic structures of the monorail line 22 and its associated tractor chain 30 are similar to those of the monorail line 18 and tractor chain 29, a detailed description of the latter will suffice.

Figure 7:
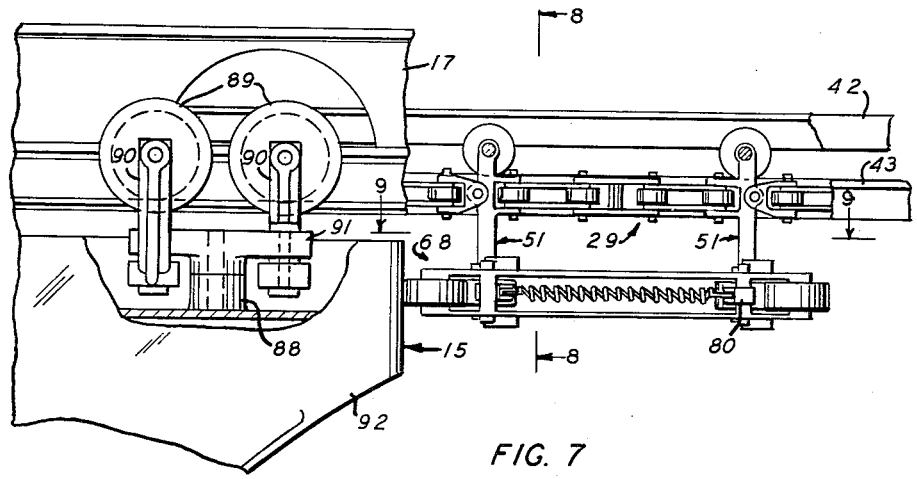
Fig. 7 is an enlarged, fragmentary elevation, partly broken away, of another portion of the apparatus.
Figure 8:
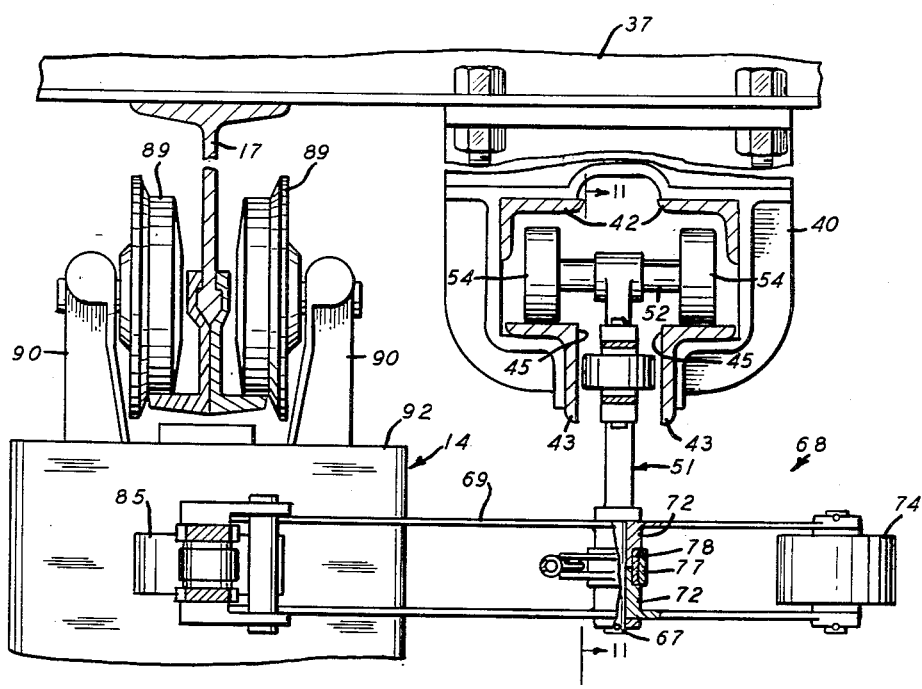
Fig. 8 is an enlarged, fragmentary, vertical section taken along line 8—8 of Fig. 7.

Referring now to Figs. 7 and 8, the monorail 17 is suspended from girder cross members 37—37 which form an integral part of the building structure. Depending from the cross members 37—37, and equidistantly spaced from the monorail 17, are a plurality of spaced hangers, one of which designated 40 is shown in Fig. 7. Upper angle track members 42—42 and lower angle track members 43—43 (Fig. 8) are fixedly secured to the hangers 40—40 to form a box-like trackway, shown in section in Fig. 8, paralleling the monorail 17. The opposing faces 45—45 of the lower track members 43—43 are spaced apart to form a longitudinally extending slot-like guideway communicating with the aforementioned trackway.

Referring now to Fig. 11, the tractor chains 29 and 30 are composed in the main of a plurality of interconnected open links 46—46 and blind links, one of which designated 47 is shown, alternately joined by link pins 49—49 in a manner to permit free lateral flexure of the chains. The open links 46—46 have bosses at their ends concentric with the link pin holes, to hold the upper and lower halves of the open links in spaced relationship, and carry freely rotatable chain rollers 50—50 thereon and therebetween to position the chain assembly in the slot-like guideway between faces 45—45 of the lower track members 43—43.

At widely spaced intervals along the chains 29 and 30, the sequence of alternate open links 46—46 and blind links 47—47 is interrupted to provide trolley attachments 51—51 which maintain the tractor chains 29 and 30 in rolling engagement with the angle track members 42—42 and 43—43. The upper part of each of the trolley attachments 51—51 is terminated in a boss containing a bore into which is pressed a shaft 52 extending equidistantly from either side of the boss. Journaled to the opposite extremities of the shaft 52 are freely rotatable trolley wheels 54—54, which are retained in the box-like trackway formed by angle members 42—42 and 43—43. The trolley wheels 54—54 may roll in contact with either the track members 42—42 or 43—43, depending upon the direction of curvature of the trackway in a vertical plane.

Projecting lugs 59—59 (Fig. 11), formed integrally with the trolley attachments 51—51 and bored to receive link pins 49—49, provide means for a laterally flexible connection with the open links 46—46. Enlarged portions 60—60 formed integrally on the trolley attachments 51—51 are bored to receive pins 61—61, which project equidistantly from either face of each of the enlarged portions 60—60 to pivotally mount clevises 62—62. The clevises 62—62 are provided with projecting lugs 65—65 formed integrally therewith and bored to receive link pins 66—66 which provide a laterally flexible connection between the clevises 62—62 and the open links 46—46.

The trolley attachments 51—51 are assembled in opposed pairs so that the chains 29 and 30 are transversely more or less rigid between the two trolley attachments in order to maintain substantially parallel vertical relationship therebetween. The lower extremities of the trolley attachments 51—51 have formed thereon downwardly projecting pintles 67—67 which pivotally support pusher mechanisms 68—68 (Figs. 9 and 10).

Each pair of trolley attachments 51—51 is designed to carry one of the pusher mechanisms 68—68, which includes a pair of substantially parallel pusher arms 69—69 pivotally mounted near one end of the depending pintles 67—67 provided on each pair of trolley attachments. The pusher arms 69—69 support at their opposite ends a pusher beam 70 generally in the manner of a pantograph (see Figs. 8, 9, 10 and 11). The pintles 67—67 are rotatably received within complementary bosses 72—72 formed integrally upon matched upper and lower longitudinal members composing the pusher arms 69—69. Suitable retaining means are provided to retain the pusher arms 69—69 in place on the pintles 67—67. At the free extended ends of the pusher arms 69—69 are mounted cylindrical counterweights 74—74.

Figure 9:
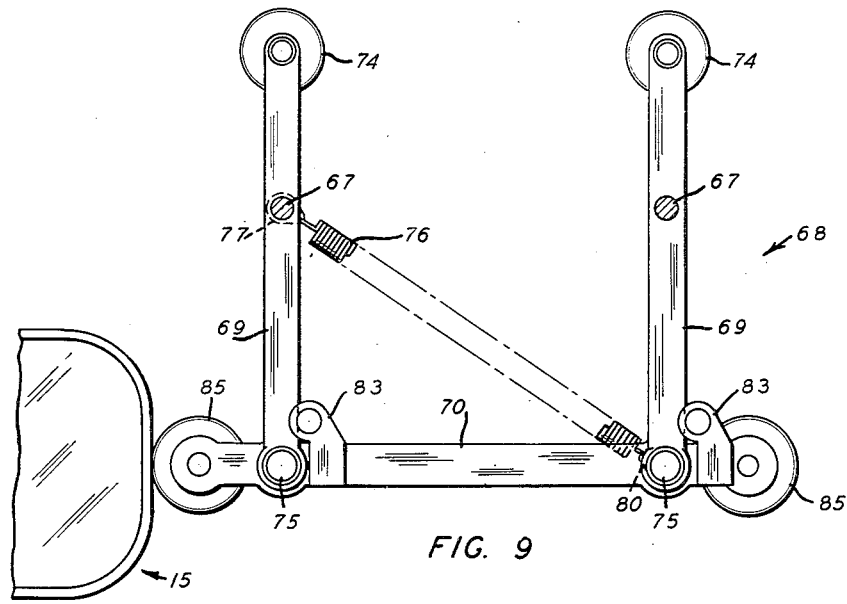
Fig. 9 is an enlarged, horizontal section taken along line 9—9 of Fig. 7, illustrating a pusher mechanism, forming a part of the apparatus, in an extended position.
Figure 10:
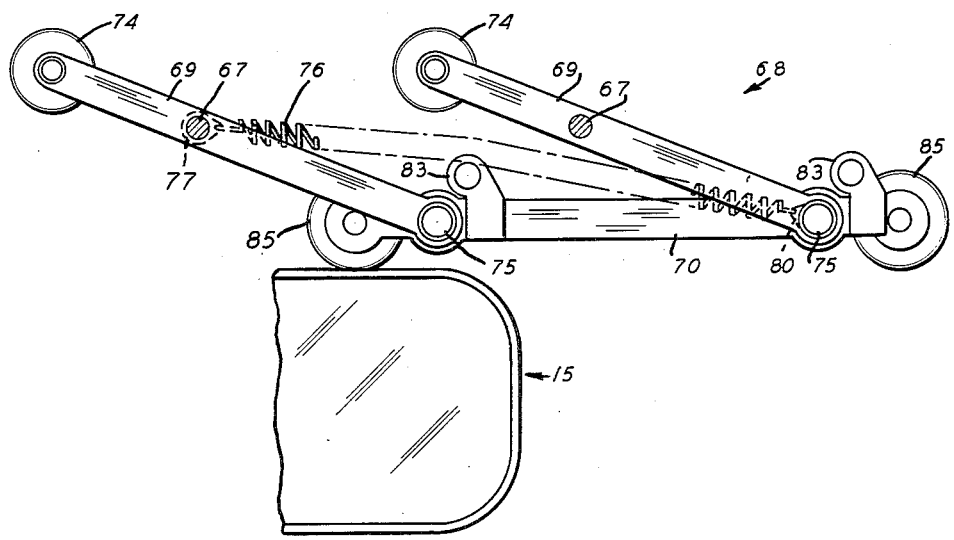
Fig. 10 is a similar view of the pusher mechanism in a retracted position.

As shown in Figs. 8, 9 and 10, each of the pusher arms 69—69 is hingedly connected to the beam 70 by means of pins 75—75. This hinged arrangement permits the pusher arms 69—69, interconnected by the pusher beam 70, to pivot in parallelism about the pintles 67—67, respectively. The two extreme positions that the pusher arms 69—69 and beam 70 may occupy are shown in Figs. 9 and 10 of the drawings, which illustrate the normal or "extended" position and the "retracted" position, respectively.

A tension spring 76 is secured at one end between a pair of tabs on the outer wall of a collar 77 mounted rotatably free on a sleeve 78 pressed onto shouldered ends of bosses 72—72. The spring 76 is secured at the opposite end by a similar collar 80, similarly mounted on a similar sleeve pressed onto similar bosses on two complementary halves composing the pusher beam 70, positioned diagonally opposite the collar 80, as viewed in Fig. 9. The spring 76 normally urges the pusher arms 69—69 and beam 70 into the "extended" position shown in Fig. 9. The amount of clockwise rotation of the arms 69—69 is limited by stops 83—83 secured to the beam 70. Mounted at either end of the beam 70, between its complementary side members, are freely rotatable bumper rollers 85—85, preferably rubber-treaded for shock reduction.

The tractor chains 29 and 30 are continuously driven by standard, general purpose, constant duty induction motors 87 and 88, respectively (Fig. 1), through suitable fluid drives (not shown) to cushion out starting jerks and to provide the necessary overload protection. The individual pusher mechanism 68—68 mounted on the chains 29 and 30 in the manner previously described, move continuously therewith in directions indicated by arrows on Fig. 1 of the drawings. The cross beam 70 of each of the pusher mechanisms 68—68 is designed to normally engage a carrier 15 with one of the bumper rollers 85—85, as viewed in Fig. 8, and impart to the carrier a propelling force transmitted by its associated continuously driven tractor chain. This propelling force is imparted to the carrier 15 along the longitudinal axis of the beam 70.

Whenever the force required to propel a carrier 15 exceeds a predetermined maximum value, such as may occur when the carrier becomes stalled due to a pile up of carriers 15—15 on a particular monorail line, the arms 69—69 rotate simultaneously, moving the beam 70 into the "retracted" position (Fig. 10) against the action of the tension spring 76. In the "retracted" position, the beam 70, with its bumper rollers 85—85, is enabled to move past the stalled carrier 15 with rolling motion. As long as the carrier 15 remains stalled, the "retracting" operation is repeated by successive pusher mechanism 68—68 on the particular tractor chain when they reach positions adjacent to the stalled carrier.

Referring now to Figs. 2, 3, 7 and 8, each of the magazine carriers 15—15 comprises in the main four pairs of flanged trolley wheels 89—89 journaled on inwardly extending stub shafts and mounted in opposed pairs on trolley wheel yokes 90—90 so that the wheel flanges engage opposite edges of the monorail track 17. The four wheel yokes 90—90 of each carrier are pivotally mounted in pairs at the ends of two load bars, one of which designated 91 is shown in Fig. 7. Each of the load bars is pivotally mounted at its center on a rectangular bed plate 88 having rounded corners, and is secured to and surrounded perimeter-wise by a cowling 92. The longitudinal sides of cowling 92 extend downwardly into ribbed gores terminating in a semicircular, eared band comprising the upper half of a cradle for pendantly supporting a magazine 14. The lower half of the cradle comprises eared, semicircular hanger straps 94—94 bolted in complementary relation to the cowling 92, to engage rotatably flanged, cylindrical surfaces of journal and brake housings 96—96 of the magazine 14.

The journal and brake housings 96—96 are located centrally in the enlarged upper portion of the outer sidewalls of complementary halves of an ovate metal casing 98 and fixedly attached thereto, so that central apertures in the journal and brake housings 96—96 are axially aligned. Pressed into the apertures are bearing sleeves 100—100 (Fig. 5), which rotatably support a hollow shaft 106 near its extremities. Fixedly attached to the hollow shaft 106 are inwardly projecting annular flanges 103—103 centrally supporting annular metallic reel heads 104—104, fixedly attached thereto, in turn fixedly supporting, concentrically with the shaft 106, a metallic reel drum 107 which constitutes a winding surface for a load reel 102.

Figure 5:
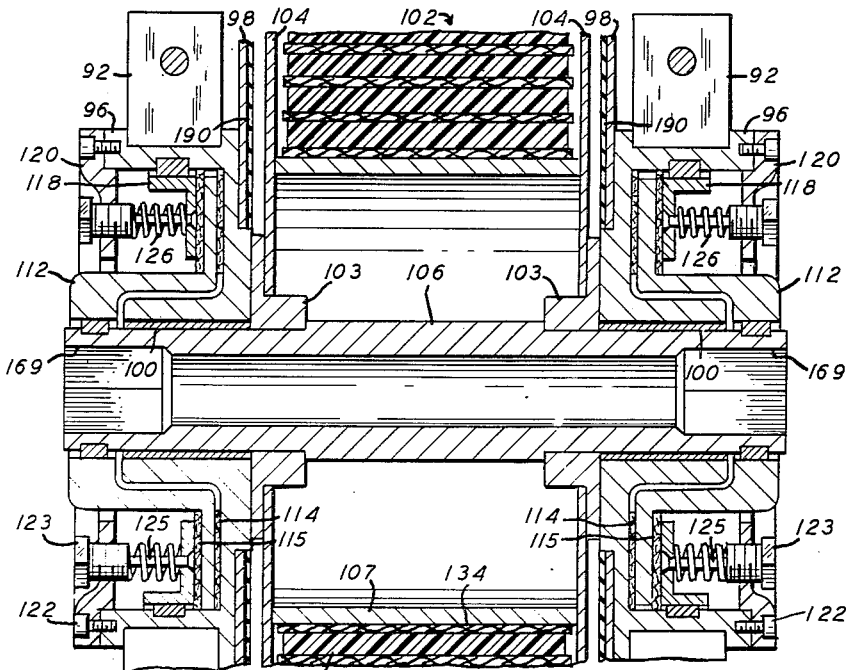
Fig. 5 is an enlarged, fragmentary, horizontal section taken along line 5—5 of Fig. 3.

Splined to the projecting ends of the shaft 106, for rotation therewith, are flanged, annular, brake plates 112—112 (Fig. 5). The plates 112—112 are splined in such a manner as to permit sliding movement axially along the shaft 106. The disc portions of the brake plates 112—112 are contacted on their parallel inner and outer faces with annular friction discs 114—114 and 115—115, respectively made of a material having a relatively high coefficient of friction. The brake plates 112—112 and the friction discs 114—114 and 115—115 are compacted and urged against complementary surfaces within a recess in the housings 96—96 by spring-pressed, flanged pressure rings 118—118 slidably splined to the inner wall of the housings.

Retainer plates 120—120 fastened to the housings 96—96 by threaded fasteners 122—122, are provided with threaded apertures spaced radially therein for receiving threaded adjustment plugs 123—123. The plugs 123—123 are provided with axial bores for slidably receiving spring guide pins 125—125, which are fixedly secured to the rings 118—118. Compression springs 126—126 are mounted on the pins 125—125 between the pressure rings 118—118 and retainer rings 120—120. By moving the adjustment plugs 123—123 axially toward or away from the rings 118—118, the force exerted by the springs 126—126 on the rings 118—118 may be increased or decreased, thereby increasing or decreasing the braking effect of the brake plates 112—112 between the friction elements 114—114 and 115—115.

A liner belt reel 130 (Fig. 6) is rotatably mounted on a shaft 128 within the smaller lower portion of the casing 98. The reel 130 and the shaft 128 are structurally identical with the reel 102 and shaft 106, respectively, and are mounted in a manner identical to that previously described in connection therewith.

A liner belt 134 of thin, flexible fabric, wax or plastic-treated to prevent sticking is secured at either end to the periphery of the drums of the reels 102 and 130, respectively. The belt 134 is initially wound spirally onto the drum of reel 130 and arranged to unwind therefrom and lay between successive convolutions of the compound strip 12 as the strip is wound onto the reel 102. This liner belt prevents sticking together and sagging of the compound strip convolutions during storage, and facilitates the winding and unwinding operations. As the compound strip 12 is unwound and removed from the magazine 14, the liner belt 134 peels away from the strip 12 and rewinds onto the reel 130 in position for subsequent reloading (see Fig. 2).

Figure 3:
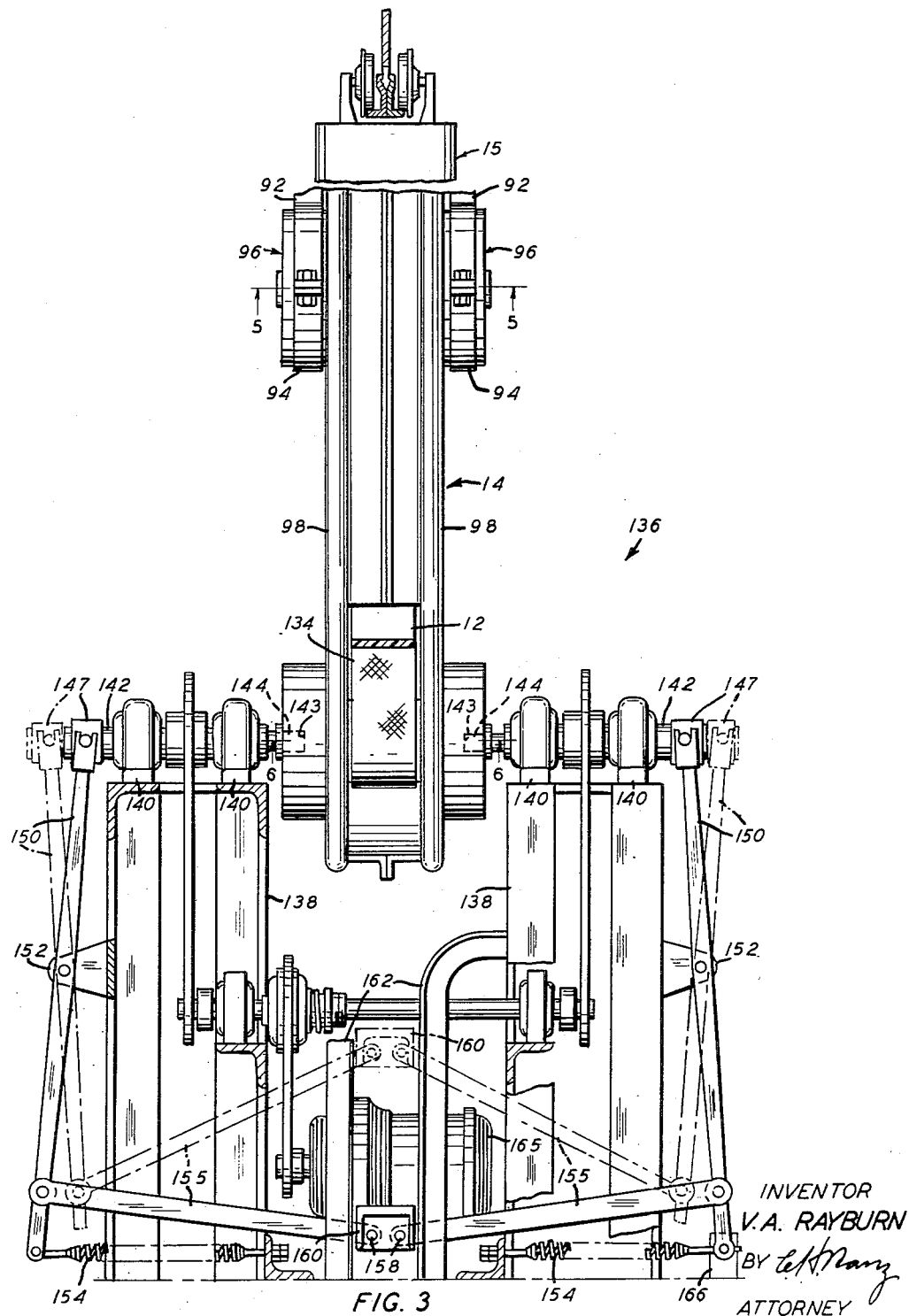
Fig. 3 is an enlarged end view, partially broken away, of portions of the apparatus shown in Fig. 2.

The steps of winding and unwinding of the compound strip 12 into and from the magazines 14—14 are facilitated by driving apparatus especially designed for this purpose. Unloading stands 136—136, one of which is shown in detail in Fig. 3, are used to unload the compound strip 12 from the magazines 14—14 into the extruders 11—11. One of the unloading stands 136—136 is located adjacent to each of the extruders 11—11, and includes a pair of spaced pedestals 138—138 mounted opposite each other equidistantly to either side of the monorail 17 of the siding 20. The distance between the pedestals 138—138 is sufficient to permit a magazine 14 depending from a carrier 15 to pass therebetween. Mounted on the top surface of the pedestals 138—138 are journal bearings 140—140 which rotatably support hollow spindles 142—142. Slidably keyed within square sockets 143—143 provided in the hollow spindles 142—142 and extending a short distance beyond the inner ends thereof are square drive centers 144—144.

The height of the pedestals 138—138 is such that when a magazine 14 is positioned therebetween, the axes of the drive centers 144—144 are at the same elevation as the axis of the shaft 128 to which the reel 130 is keyed, thereby facilitating the alignment of the drive centers 144—144 with square sockets 143—143 provided at the ends of the shaft 128. Shifting collars, shown generally at 147—147, mounted on the outer ends of the drive centers 144—144 facilitate axial movement of the drive centers within the spindles 142—142 and permit the centers to be moved selectively into and out of engagement with the square sockets 143—143. The shifting collars 147—147 are operated selectively and simultaneously by shift levers 150—150 pivotally mounted on fulcrums 152—152 intermediate of the ends thereof. The lower ends of the levers 150—150 are urged inwardly by tension springs 154—154 anchored to the bases of the pedestals 138—138.

Linkage arms 155—155 are pivotally secured at one end by pins 157—157 to the shift levers 150—150 and at the other end by pins 158—158 to a foot pedal 160. The foot pedal 160 is confined within a vertical guideway formed by guide members 162—162 which permit vertical movement of the foot pedal 160 therebetween. When the foot pedal 160 is fully depressed as shown in the solid outline on Fig. 3, the shift levers 150—150 are held in such a position as to cause the drive centers 144—144 to be moved into and retained in engagement with the square sockets 143—143. When the foot pedal is moved upwardly to the position shown in dotted outlines in Fig. 3, the shift levers 150—150 are urged by the springs 154—154 into a position wherein the drive centers 144—144 are disengaged from the square sockets 143—143. The drive centers 144—144 are rotatably driven through standard pulley and belt arrangements by an electric motor 165 mounted between the pedestals 138—138.

A limit switch 166 (Fig. 3) is mounted adjacent to the lower end of the right hand shift lever 150 and is arranged to be actuated when the foot pedal 160 is fully depressed. When the limit switch 166 is actuated, it connects the motor 165 to a suitable power supply through an associated motor control circuit.

Figure 4:
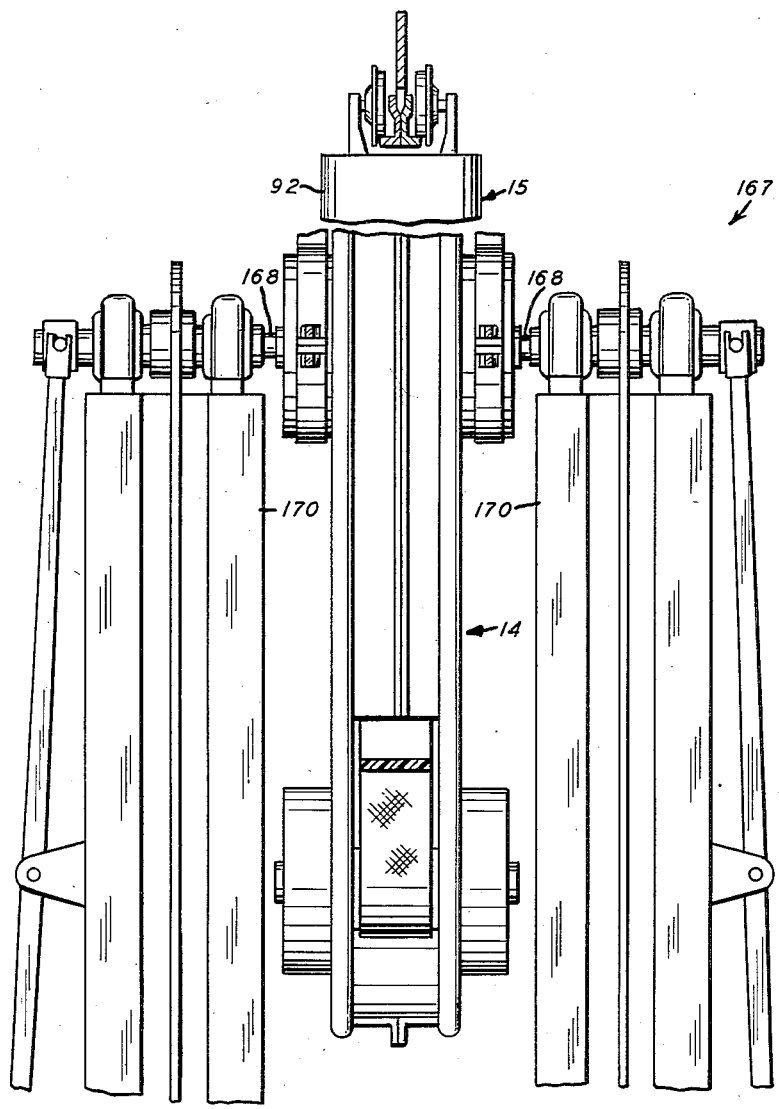
Fig. 4 is an enlarged, fragmentary, end view of another portion of the apparatus.

Loading stands, shown schematically at 167—167 in Fig. 1, are provided at each of the compound coolers 13—13, and are similar in construction to the unloading stands 136—136. Referring now to Fig. 4, the pedestals 170—170 of the loading stands 167—167 are of greater height than their counterparts in the unloading stands 136—136, and are designed so that the longitudinal axes of drive centers 168—168 provided thereon may be aligned with the axis of the shaft 106 so that the ends of the drive centers 168—168 may be selectively engaged in square sockets 169—169 provided in the shaft 106. In this manner the reel 102 may be driven to wind up a compound strip 12 emerging from one of the coolers 13—13.

Referring now to Fig. 2, an extruder feed mechanism is shown generally at 171. The feed mechanism 171 includes a toothed feed wheel driven by a suitable ratchet drive means (not shown) for feeding the strip 12 to the stock screw of the extruder. Due to the characteristics of certain types of extruders, a strip, such as the strip 12, cannot be fed to the extruder at a constant rate. Hence, means (not shown) are associated with the feed mechanism for starting and stopping the toothed feed wheel, and engaging and disengaging the ratchet drive means.

It is apparent that, if the energization of the electric motor 165 is not coordinated with the demands of the extruder, serious difficulties might arise. In order to prevent such difficulties, a slack loop compensator mechanism, shown generally at 172, is provided. The compensator mechanism includes a pulley 175 rotatably mounted on a clevis support 176. The clevis support 176 is slidably mounted on a pair of vertically disposed guide rods, one of which designated 178 is shown in Fig. 2, secured at their opposite ends to the pedestals 138—138. Adjacent to the ends of the guide rods 178—178 are limit switches 180 and 181, arranged to be actuated when the clevis support 176 approaches the ends of the rods adjacent thereto.

The limit switches 180 and 181 are connected into the motor control circuit of the electric motor 165 in a manner hereinafter to become apparent. The limit switch 180 is arranged to stop the motor 165 when the supply of strip 12 exceeds the demands of the extruder 11 to such an extent that the loop of compound enlarges and causes the slidable clevis support 176 to reach the lower end of the guide rods 178—178. The motor 165 will then remain de-energized until the extruder feed mechanism 171 consumes the slack to such an extent that the clevis support 176 moves upwardly to the top end of the guide rods 178—178 and actuates the limit switch 181 which re-energizes the motor 165.

The tractor chains 29 and 30, their associated support structures and power drive means, exclusive of the pusher mechanisms 68—68, are composed in the main of standard commercial items. The chains 29 and 30 are similar to the #F-338 Drop-Forged Chain and Trolley which is manufactured by the Palmer-Bee Company, Detroit, Michigan.

The monorail switch mechanisms, shown schematically at 19—19, are standard monorail equipment. Similar mechanisms are illustrated on page 58 of catalog D (revised January 1, 1948) of the American Monorail Company, Cleveland, Ohio. Suitable stops (not shown) are provided on the switch mechanism for preventing subsequent carriers 15—15 from leaving the monorail 17 at the switch connections, due to open ends, while a particular carrier is being switched onto the standing sidings. The stops serve to hold up the next carrier as long as the switch mechanism is open. When a carrier 15 is held up by a stop, its associated pusher mechanism will retract in a manner previously described, and disengage itself therefrom permitting it to pass by the stopped carrier 15.

Figure 6:
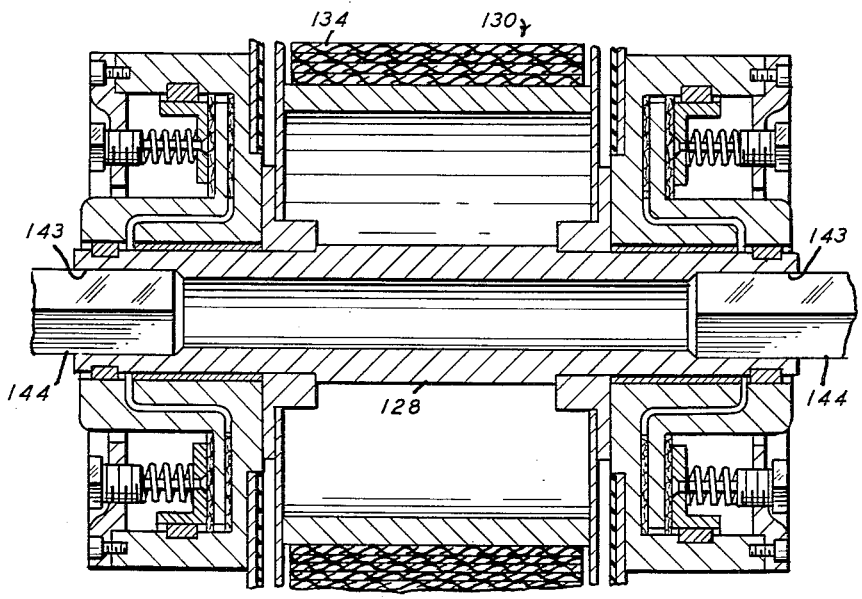
Fig. 6 is an enlarged, fragmentary, horizontal section taken along line 6—6 of Fig. 3.

As previously mentioned, it is sometimes necessary to provide means for thermally insulating the compound while it is temporarily stored or enroute to the extruders 12—12. For this reason, it has been found desirable to line the inner walls of the metal casing 98 with an insulating lining, shown generally at 190 (Figs. 5 and 6). The lining 190 may be made of ground cork or sheet cork cemented to the walls of the casing by heat-resistant cement.

Operation

At one of the compound coolers 13—13, a compound strip 12 is wound between successive layers of the canvas liner belt 134 upon the drum 107 of reel 102 of the magazine 14. The loaded magazine 14 supported by the carrier 15 is then manually moved and switched from the cooler siding 16 onto the "loaded magazine" line 18. Once on the line 18, the carrier 15 is engaged by the leading roller 85 of the next approaching one of the pusher mechanisms 68—68 carried by the continuously driven endless tractor chain 29. The carrier 15 is propelled along the line 18 until it is eventually switched by an operator onto one of the sidings 20—20. This switching is performed whenever a replenishment of the supply of compound strip 12 is required at one of the extruders 11—11.

The operator manually directs the carrier 15 with its depending magazine 14 along the monorail 17 of the siding 20 and into position between the pedestals 138—138 of the unloading stand 136 adjacent to a particular extruder 11. Care must be taken to see that the axis of the shaft 128 is aligned with axes of the drive centers 144—144. With the magazine in this position, the foot pedal 160 is fully depressed, as shown in Fig. 3, causing the drive centers 144—144 to become engaged and retained in the square sockets of the shaft 128, whereupon the drive motor is energized through the limit switch 166 to drive the reel 130 to unwind the compound strip 12 from the magazine 14 into the extruder.

Before entering the extruder, however, the free end of the compound strip 12 is threaded around the pulley 175 and into the extruder feed mechanism, shown generally at 171, associated with the extruder. When the reel 102 is empty, the pulley 175 drops and the lower limit switch 180 is actuated to de-energize the motor 165, whereupon the operator manually releases the foot pedal 160 to withdraw the drive centers 144—144 from the sockets in the shaft 128.

The empty magazine 14, with its associated carrier 15, is then pushed manually along the siding 20 and switched onto the "empty magazine" line 22. Once on the line 22, the carrier 15, with its empty magazine 14, is engaged by one of the pusher mechanisms 68—68 of the tractor chain 30, which transports the carrier and magazine around the line 22. The empty magazine 14 is transported along the line 22 until it is switched by an operator onto one of the loading sidings 16—16 or the storage sidings 26—26.

The loading of the magazine 14 at the strip coolers 13—13 is performed in a manner similar to the unloading operation heretofore described. The empty magazine 14, with its associated carrier 15, is manually moved along the siding 16 until it is positioned between the drive centers 168—168 (Fig. 4) of one of the loading stands 167—167. These centers 168—168 rotate the reel 102 to cause a length of compound strip to be wound thereon between the successive layers of the canvas liner belts 134.

Manifestly, the invention is not limited to the heretofore described details of a particular embodiment thereof, and various modifications thereof may be made within the spirit and scope of the invention.

What is claimed is:

1. Apparatus for transporting flexible strips of plastic compound, which comprises a track, a mobile container movably supported on the track, means for propelling the container, a cowled carrier movably supported on said track having cradle means for pivotally suspending said container from said track, the cowled portion of said carrier forming an abutting means for the propelling means to push the container along said track, a compound storage reel, a liner belt reel, the reels being journaled within the container for rotation about spaced parallel axes of rotation, at least one axle member for rotatably supporting said storage reel in said container, said container enclosing the reels except for a relatively small opening, a liner belt secured fixedly at one end to the storage reel and at the other end thereof to the liner belt reel upon which it may be spirally wound, means for selectively rotating the compound storage reel so as to wind thereupon the liner belt and a strip of plastic compound fed through the opening in the container so that the liner belt lies between successive convolutions of the compound strip wound upon the compound storage reel, means for selectively rotating the liner belt reel so as to rewind the liner belt upon the liner belt reel and simultaneously to feed the compound strip from the container through the opening therein, an annular brake plate splined to at least one of said axle members for preventing relative rotation therebetween and for permitting sliding movement of the plate along the axes of rotation thereof, a plurality of annular friction discs having a relatively high coefficient of friction mounted in said cradle, at least one on each opposing side of said plate, and resilient means for adjustably varying the distance between the annular friction discs on opposing sides of said plate for varying the frictional force thereon, said resilient means being adjustable during the rotation of said storage reel for varying the amount of braking thereon.

2. Apparatus for transporting flexible strips of plastic compound, which comprises a track, a mobile container movably supported on the track, means for propelling the container, a cowled carrier movably supported on said track having cradle means for pivotally suspending said container from said track, the cowled portion of said carrier forming an abutting means for the propelling means to push the container along said track, a compound storage reel, a liner belt reel, the reels being journeled within the container for rotation about spaced parallel axes of rotation, at least one axle member for rotatably supporting said storage reel in said container, said container enclosing the reels except for a relatively small opening, a liner belt secured fixedly at one end to the storage reel and at the other end thereof to the liner belt reel upon which it may be spirally wound, means for selectively rotating the compound storage reel so as to wind thereupon the liner belt and a strip of plastic compound fed through the opening in the container so that the liner belt lies between successive convolutions of the compound strip wound upon the compound storage reel, means for selectively rotating the liner belt reel so as to rewind the liner belt upon the liner belt reel and simultaneously to feed the compound strip from the container through the opening therein, and braking means mounted in the cradle of said carrier which is adjustable during the rotation of said storage reel for varying the amount of braking thereon.

References Cited in the file of this patent

UNITED STATES PATENTS

| | | |
|---|---|---|
| 2,034,063 | Stacey | Mar. 17, 1936 |
| 2,201,013 | Rosenthal | May 14, 1940 |
| 2,344,155 | McBride | Mar. 14, 1944 |
| 2,524,106 | Hanson | Oct. 3, 1950 |
| 2,565,740 | Robertson et al. | Aug. 28, 1951 |
| 2,569,589 | Trissell | Oct. 2, 1951 |
| 2,612,847 | Burrows | Oct. 7, 1952 |
| 2,614,506 | Mullerheim | Oct. 21, 1952 |
| 2,641,413 | Bruestle | June 9, 1953 |
| 2,658,691 | Mallory | Nov. 10, 1953 |
| 2,668,572 | Bostwick | Feb. 9, 1954 |